(12) United States Patent
Bracht et al.

(10) Patent No.: US 12,361,054 B2
(45) Date of Patent: Jul. 15, 2025

(54) METHOD AND APPARATUS FOR ASSIGNING A RELIABILITY SCORE FOR TIP SUBMISSIONS

(71) Applicant: MOTOROLA SOLUTIONS, INC., Chicago, IL (US)

(72) Inventors: Eamon Bracht, La Grange, IL (US); James A Niewiara, Elmhurst, IL (US); Minjoong Kim, Savoy, IL (US); Jacob D Rubin, Long Grove, IL (US); Kruthi Challa, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 335 days.

(21) Appl. No.: 18/171,461

(22) Filed: Feb. 20, 2023

(65) Prior Publication Data
US 2024/0281465 A1    Aug. 22, 2024

(51) Int. Cl.
| | |
|---|---|
| *G06Q 10/10* | (2023.01) |
| *G06F 16/55* | (2019.01) |
| *G06F 16/583* | (2019.01) |
| *G06Q 10/06* | (2023.01) |
| *G06Q 30/02* | (2023.01) |
| *G06Q 30/06* | (2023.01) |
| *G06Q 50/26* | (2012.01) |

(52) U.S. Cl.
CPC ............ *G06F 16/55* (2019.01); *G06F 16/583* (2019.01); *G06Q 50/265* (2013.01)

(58) Field of Classification Search
CPC ..... G06F 16/55; G06F 16/583; G06Q 50/265; G06Q 50/01

USPC .................................................... 705/1.1–912
See application file for complete search history.

(56) References Cited

U.S. PATENT DOCUMENTS

| | | | |
|---|---|---|---|
| 7,379,879 B1 * | 5/2008 | Sloo ..................... | G06Q 50/265 |
| | | | 705/325 |
| 7,616,237 B2 | 11/2009 | Fridrich et al. | |
| 8,374,386 B2 * | 2/2013 | Bayram ............. | G06F 16/7847 |
| | | | 707/736 |
| 8,856,165 B1 * | 10/2014 | Cierniak ................ | G06Q 10/10 |
| | | | 705/28 |
| 10,037,314 B2 * | 7/2018 | Bills ....................... | H04W 4/08 |
| 10,235,765 B1 * | 3/2019 | Charlton ................ | G06V 10/22 |
| 12,039,271 B2 * | 7/2024 | Jurzak ................... | G06F 16/243 |
| 2011/0125746 A1 * | 5/2011 | Leary ................. | B64D 45/0063 |
| | | | 707/737 |

(Continued)

OTHER PUBLICATIONS

Amerini, I., Baldini, G., & Leotta, F. "Image and video forensics." Journal of Imaging, 7(11), 242. Nov. 17, 2021. doi:http://dx.doi.org/10.3390/jimaging7110242 (Year: 2021).*

(Continued)

*Primary Examiner* — Jonathan P Ouellette
(74) *Attorney, Agent, or Firm* — Daniel R Bestor (57) ABSTRACT

A method and apparatus for providing a reliability score for a submitted tip is provided herein. During operation, when a user anonymously submits an image to a tipping server, the tipping server determines if an imager (e.g., a camera) used to capture the image has been used to capture any past images submitted to the tipping server. If so, a reliability score is determined for the imager that is based on a reliability of the past images submitted. The reliability score is then presented to any user viewing the image.

17 Claims, 5 Drawing Sheets

(56) References Cited

U.S. PATENT DOCUMENTS

| | | | | |
|---|---|---|---|---|
| 2011/0276423 | A1* | 11/2011 | Davidson | H04N 21/44016 |
| | | | | 705/26.1 |
| 2012/0195476 | A1* | 8/2012 | Bayram | G06V 10/40 |
| | | | | 382/124 |
| 2013/0159330 | A1* | 6/2013 | Smith | G06Q 50/01 |
| | | | | 707/758 |
| 2014/0057590 | A1* | 2/2014 | Romero | G08B 25/08 |
| | | | | 455/404.2 |
| 2015/0304300 | A1* | 10/2015 | Bender | H04L 51/214 |
| | | | | 726/4 |
| 2016/0183074 | A1* | 6/2016 | Pahlevani | H04W 4/14 |
| | | | | 455/404.1 |
| 2016/0371968 | A1* | 12/2016 | Almansour | G06Q 10/00 |
| 2017/0055138 | A1* | 2/2017 | McDonnell | H04W 4/021 |
| 2019/0122226 | A1* | 4/2019 | Ekambaram | H04L 63/1408 |
| 2020/0125218 | A1* | 4/2020 | Bender | H04L 51/04 |
| 2020/0151841 | A1* | 5/2020 | Schuler | G06Q 50/265 |
| 2021/0350357 | A1* | 11/2021 | Lafontaine | G06Q 20/401 |
| 2021/0383256 | A1* | 12/2021 | Lafontaine | G06N 20/00 |
| 2022/0292622 | A1* | 9/2022 | Soscia | H04L 9/3242 |
| 2022/0335824 | A1* | 10/2022 | Carson | G06V 10/757 |

OTHER PUBLICATIONS

Sun, Y., Ni, R., & Zhao, Y., "MFAN: Multi-level features attention network for fake certificate image detection." Entropy, 24(1), 118. Jan. 13, 2022. doi:http://dx.doi.org/10.3390/e24010118 (Year: 2022).*

Y. Chen, T. Qiao, F. Retraint and G. Hu, "Efficient Privacy-Preserving Forensic Method for Camera Model Identification," in IEEE Transactions on Information Forensics and Security, vol. 17, pp. 2378-2393, 2022, doi: 10.1109/TIFS.2022.3185769.

M. Mohanty, M. Zhang, M. R. Asghar and G. Russello, "Pandora: Preserving Privacy in PRNU-Based Source Camera Attribution," 2018 17th IEEE International Conference on Trust, Security and Privacy in Computing and Communications/ 12th IEEE International Conference on Big Data Science and Engineering (TrustCom/BigDataSE), New York, NY, USA, 2018, pp. 1202-1207, doi: 10.1109/TrustCom/BigDataSE.2018.00166.

Reinders, S, Guan, Y, Ommen, D, Newman, J. Source-anchored, trace-anchored, and general match score-based likelihood ratios for camera device identification. J Forensic Sci. 2022; 67: 975-988. https://doi.org/10.1111/1556-4029.14991.

N. Yu, L. Davis and M. Fritz, "Attributing Fake Images to GANs: Learning and Analyzing GAN Fingerprints," 2019 IEEE/CVF International Conference on Computer Vision (ICCV), Seoul, Korea (South), 2019, pp. 7555-7565, doi: 10.1109/ICCV.2019.00765.

* cited by examiner

METHOD AND APPARATUS FOR ASSIGNING A RELIABILITY SCORE FOR TIP SUBMISSIONS

BACKGROUND OF THE INVENTION

Knowledge provided to law enforcement from individuals within a community can help keep neighborhoods safe. Providing new ways to connect, beyond calling an emergency number (e.g., 911), will increase engagement and strengthen collaboration between public-safety agencies and the public.

One technique for obtaining knowledge from individuals about public-safety events, beyond calling an emergency number, is through anonymous submission of tips through a dedicated, non-emergency server. For example, Motorola Solution's TipSubmit® is a crime tipping service that empowers citizens to anonymously share information with a quick and simple web submission form. Agencies then have the power to easily manage, share, and act on the anonymous tip information from a dedicated tip management interface.

Although the above tip submission mechanisms provide a user the ability to anonymously share information with authorities, there are situations when a public-safety officer would benefit by knowing a reliability of a submitted tip. Therefore a need exists for a tip-submit system that provides a reliability score for submitted tips, yet allows users to anonymously share information with authorities.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In order to address the above-mentioned need, a method and apparatus for providing a reliability score for a submitted tip is provided herein. During operation, when a user anonymously submits an image to a tipping server, the tipping server determines if an imager (e.g., a camera or scanner) used to capture the image has been used to capture any past images submitted to the tipping server. If so, a reliability score is determined for the imager that is based on a reliability of the past images submitted. The reliability score is then presented to any user viewing the image.

Expanding on the above, the issue of digital identity and provenance of images and video is an increasingly important issue in a world of generative models and social media. Being able to link an image with an imager (e.g., a digital photo with a digital camera) without revealing anything about the individual who submitted the image has the potential to balance anonymity with reliability.

In one embodiment of the present invention, a technique called photo-response non uniformity (PRNU) is used to determine a "fingerprint" of an image. The fingerprint is unique to the imager, and is based on defects in the lens from the manufacturing process. Like human fingerprints, the defects are unique to the particular imager acquiring the image. This technique is described in detail in U.S. Pat. No. 7,616,237 by Fridrich et al., and incorporated by reference herein. As described by Fridrich, it is possible to determine if images are derived from a common imager, (e.g., a camera, or other imaging device such as a scanner) based on the device's measured or inferred reference noise pattern.

In addition to PRNU, other techniques can also be used to determine if images are derived from a common imager. For example newer methods such as disentanglement networks for fake-image detection are more advanced methods that have the potential to achieve the same effect as PRNU but with better accuracy. Additionally, recent work in the field of deep learning has attempted to do something similar to PRNU by resolving the unique fingerprint left behind by generative models (models that create fake images). This is known as Generative Adversarial Network (GAN) fingerprinting. GAN fingerprinting is described in detail in "Attributing Fake Images to GANs: Learning and Analyzing GAN Fingerprints", by Davis, et. al.

Regardless of the technique used to determine a particular fingerprint for an image (e.g., GAN fingerprinting, PRNU, . . . , etc.) the particular fingerprint comprises a unique number, data, or identifier for an imager. All images taken from a particular imager will have the same fingerprint. The fingerprint can be used to determine if any submitted image shares a fingerprint with images submitted in the past, and thus is taken with the same imager.

During operation, a database is created comprising fingerprints for imagers that have been used to submit past images. For each imager fingerprint, a score is associated with the imager/fingerprint. The score can be thought of as a metric identifying how reliable images from this particular imager have been in the past.

When a new tip is received, metadata is stripped from any image provided with the tip in order to protect the identity of the person submitting the tip. Fingerprinting is then performed on the image to determine a fingerprint for the imager that created the image. The database of imager fingerprints is accessed to determine if a match exists between the imager used for the currently-submitted tip and any imagers within the database. If a match exists between the imager used for the currently-submitted tip and any past imager used to submit past tips, then the past imager's score is associated with the new tip.

The newly-submitted tip can be scored at any point, and that score can be used to modify the existing score of the imager that created the image submitted with the tip. More particularly, even though a reliability score may be provided to an officer accompanying a tip, the officer will also have the opportunity to score the current tip. So, for example, even though a reliability score of 3.2 is provided to an officer with the current tip, the officer will be allowed to score the current tip. The tip may not be useful, so the officer may give it a low score (e.g., 1), or alternatively, the tip may be very useful so the officer may give the tip a high score (e.g., 5). The officer's score for the tip will be used to modify the existing score of the imager/fingerprint stored in the database.

As described above, each imager fingerprint stored within the database has an associated score. Obviously there are many different techniques that can be used to score each fingerprint; however, in the preferred embodiment of the present invention, any scoring technique utilized will indicate a reliability of the tip submitted. In one embodiment, the scoring is done on a scale of 1-5. Each officer that views the tip (comprising an image) is allowed to give their opinion on how "reliable" the tip is. The score given by any officer can then be used to modify the existing score of the fingerprint associated with the imager that created the image submitted with the tip. For example, all scores for a particular imager can be averaged. This is illustrated in table 1 below.

TABLE 1

Imager fingerprints and associated average reliability scores

| Imager Fingerprint | Average Reliability Score |
|---|---|
| 12048372812340312395 | 3.2 |
| 48577382945069382717 | 4.4 |
| ... | ... |
| 176685849300098982235 | 1.3 |

Figure 1:
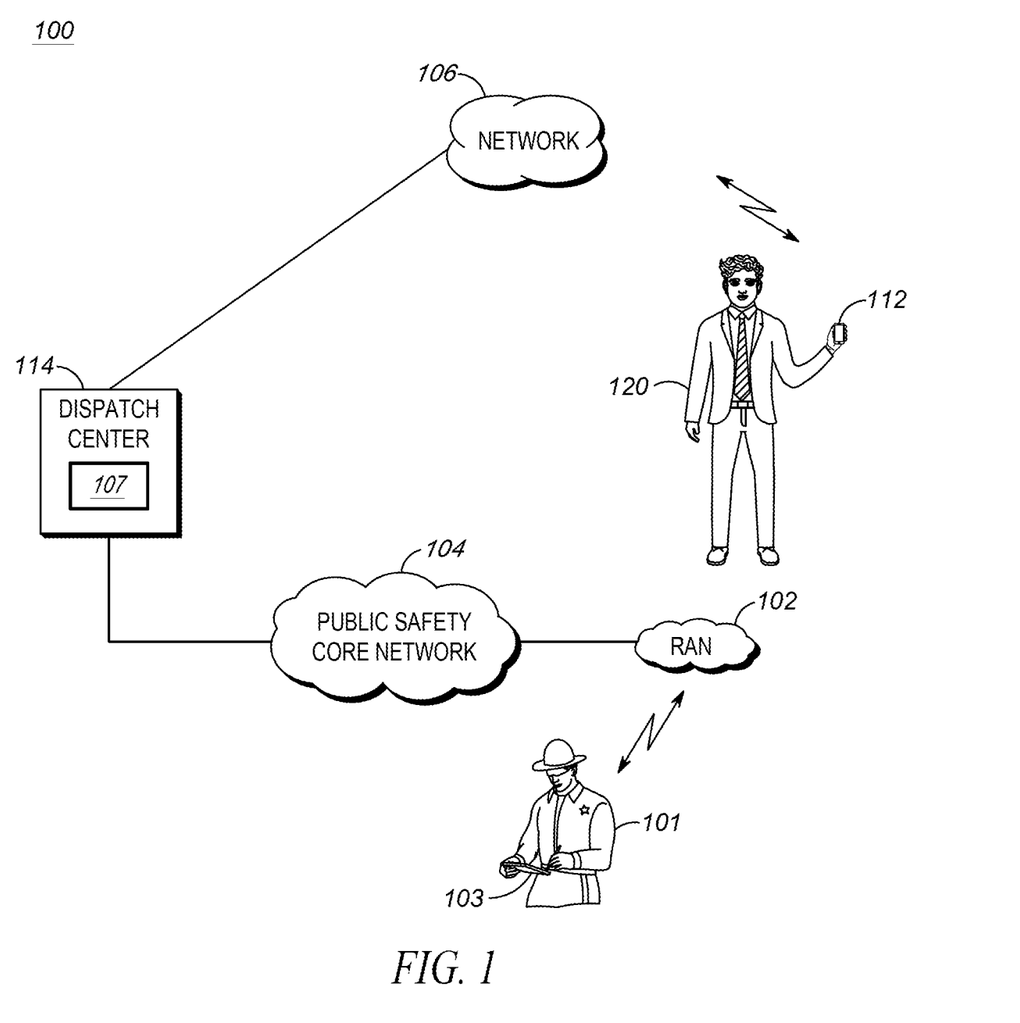
FIG. 1 shows a general operating environment for the present invention.

FIG. 1 illustrates a system for implementing the present invention. System 100 includes one or more radio access networks (RANs) 102, a public-safety core network 104, smart device 112, network 106, memory 107, and emergency dispatch center 114 serving as a tip-submit server.

As shown in FIG. 1, several separate networks exist, namely public-safety core network 104, and public network 106 (e.g., Verizon, Spring, AT&T, . . . , etc.). Network 106 may be wired or wireless, and comprises a standard network configured to facilitate standard data transmission between any device 112 and dispatch center 114.

Each RAN 102 includes typical RAN elements such as base stations, base station controllers (BSCs), routers, switches, and the like, arranged, connected, and programmed to provide wireless service to user equipment 103 (e.g., any smart device, computer, tablet computer operated by officer 101, . . . , etc.) in a manner known to those of skill in the relevant art.

In a similar manner, network 106 includes elements (which may be shared) such as base stations, base station controllers (BSCs), routers, switches, and the like, arranged, connected, and programmed to provide data service to user equipment 112 (e.g., smart phone or computer 112 operated by user 120) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications to/from officer 101.

Smart device 112 may be any suitable computing and communication devices configured to engage in wired or wireless communication over network 106. Such communication may comprise standard cellular data. For example, smart device 112 may comprise a mobile device running an Android™ or iOS™ operating system and running a tip-submit application.

Dispatch center 114 (sometimes referred to as a public-safety access point (PSAP)) is part of a computer-aided-dispatch center, preferably manned by an operator and configured to receive E-911 calls and/or anonymous information via a tip-submit service from device 112. Information received from device 112 at dispatch center 114 may be provided/forwarded to officer 101 (via core network 104 and RAN 102). For example, dispatch center 114 typically comprises a graphical user interface that provides the dispatch operator necessary information about public-safety incidents. This information may be accessed by a smart device 103 carried by an officer, or simply by a computer accessing memory 107.

Finally, memory 107 is provided. Although memory 107 is shown existing within dispatch center 114, in alternate embodiments, memory 107 may be located outside of dispatch center 114, or exist on multiple entities and provided as a cloud service. When located outside of dispatch center 114, memory 107 is connected to dispatch center 114 through an intervening network (e.g., networks 104 or 106). Memory 107 serves to store information shown above in Table 1.

As discussed, dispatch center 114 is configured to receive anonymous submissions of tips. The tips usually comprise reports sent in by users 120 with information about a public-safety incident. Images may be included with any submitted tip. In one embodiment of the present invention, dispatch center 114 comprises a Motorola Solution's Tip-Submit® server that empowers citizens to anonymously share information with a quick and simple web submission form. Dispatch center 114 will then have the power to easily manage, share, and act on the anonymous tip information from a dedicated tip management interface.

During operation, dispatch center 114 is configured to receive anonymous tips from device 112. As discussed above, anonymous tips may comprise digital images. Metadata is stripped from the images by dispatch center 114. Dispatch center 114 then fingerprints the image to determine if prior images were submitted (with prior tips) using the same imager as used with the current tip. If so, the score for the fingerprint/imager is provided to a user along with the tip. This is illustrated in FIG. 2.

Figure 2:
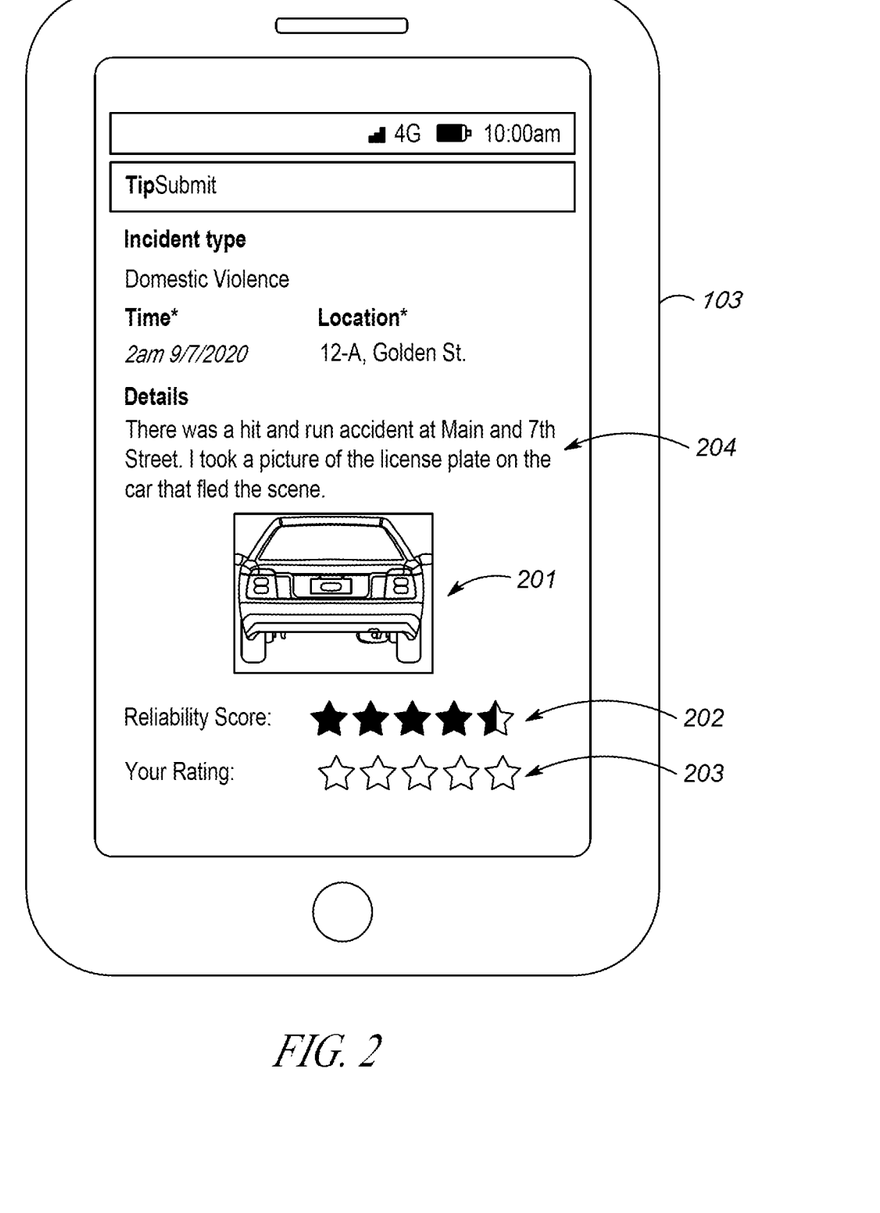
FIG. 2 illustrates a request sent to a user to report an incident to an emergency number.

As shown in FIG. 2, the officer's smart device 103 has been provided a tip submitted by an anonymous person. As is evident, the tip comprises image 201 and accompanying text 204. Image 201 has been fingerprinted and determined to be taken from an imager that has submitted tips in the past (e.g., fingerprint 48577382945069382717 from table 1 having a reliability score of 4.4). Because of this, the reliability score for the tip provided to the officer will be 4.4 stars.

As is evident, the officer viewing the tip is allowed to rate the current tip by assigning it a score of 1-5. If rated by the officer, the current officer's rating will be averaged with the reliability score already associated with fingerprint 48577382945069382717. In this particular embodiment, shown in FIG. 2, an officer can rate the current tip by simply pressing a particular "star" on their touch screen.

Figure 3:
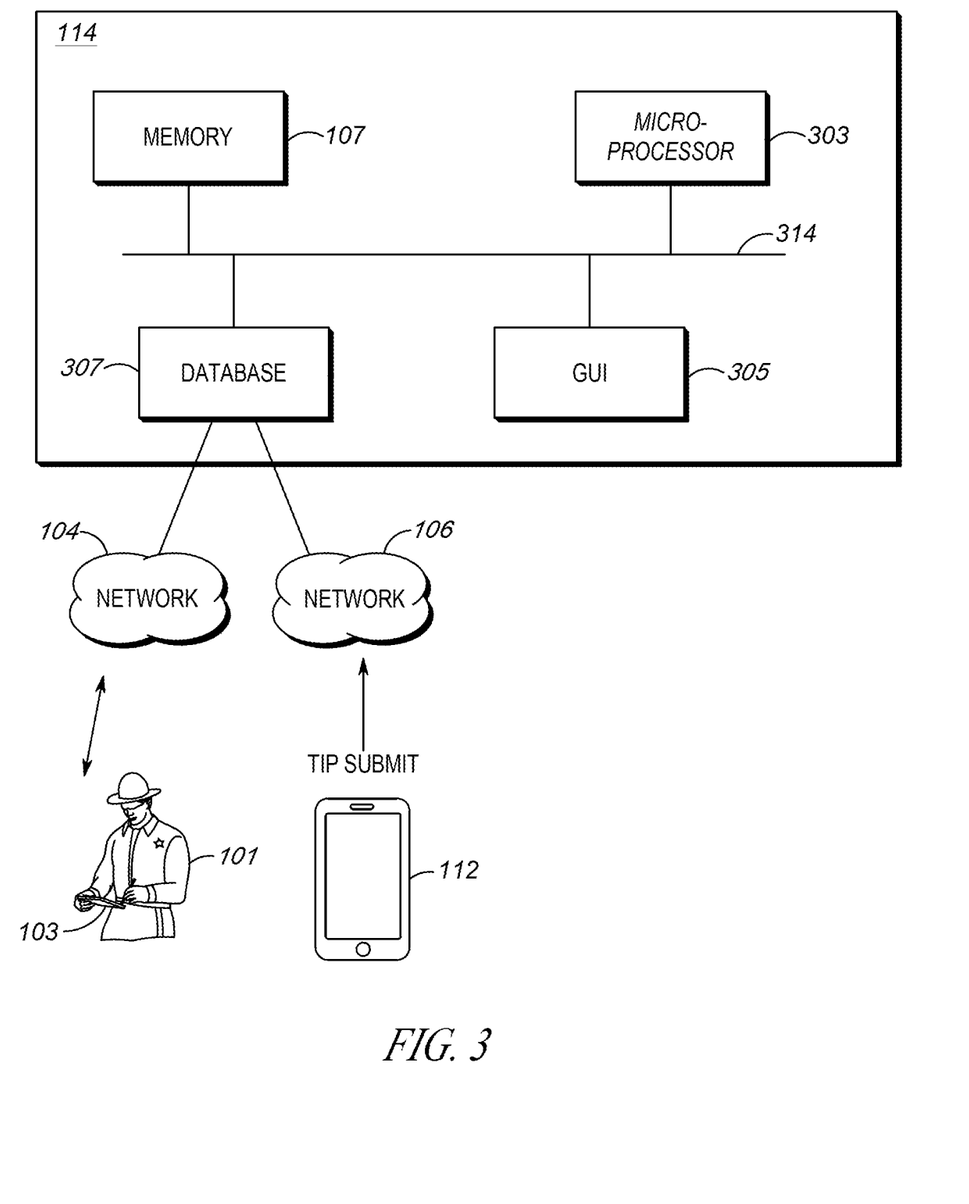
FIG. 3 is a block diagram of the dispatch center of FIG. 1.

FIG. 3 illustrates a block diagram of dispatch center 114 serving as a tip submit server in accordance with some embodiments. Dispatch center 114 may include various components connected by a bus 314. Dispatch center 114 may include a hardware processor (logic circuitry) 303 such as one or more central processing units (CPUs) or other processing circuitry able to provide any of the functionality described herein when running instructions (computer code, computer programs, . . . , etc.). Logic circuitry 303 may be connected to memory 107 that may include a non-transitory machine-readable medium, on which is stored one or more sets of instructions. Memory 107 may include one or more of static or dynamic storage, or removable or non-removable storage, for example. A machine-readable medium may include any medium that is capable of storing, encoding, or carrying instructions for execution by processor 303, such as solid-state memories, magnetic media, and optical media. Machine-readable media may include, for example, Electrically Programmable Read-Only Memory (EPROM), Random Access Memory (RAM), or flash memory. In addition to storing instructions for logic circuitry 303, memory 107 is also configured to store the information shown above in table 1 as well as any tips received from the public.

The instructions stored in memory 107 enable dispatch center 114 to operate in any manner thus programmed, such as the functionality described specifically herein, when processor 303 executes the instructions. The machine-readable medium may be stored as a single medium or in multiple media, in a centralized or distributed manner. In some embodiments, instructions may further be transmitted or received over a communications network via a network interface 307 utilizing any one of a number of transfer protocols (e.g., frame relay, internet protocol (IP), transmission control protocol (TCP), user datagram protocol (UDP), hypertext transfer protocol (HTTP), etc.).

Network interface 307 may thus enable dispatch center 114 to receive tips from user via network 106 or transmit and receive tips to officers 101 through network 104 via wired or wireless communication. Network interface 307 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which dispatch center 114 may be connected via network interface 307 may include a local area network (LAN), a wide area network (WAN), a packet data network (e.g., the Internet), mobile telephone networks (e.g., cellular networks), and wireless data networks.

Graphical-User Interface (GUI) 305 provides a man/machine interface for receiving an input from a user (e.g., an operator within the dispatch center) and displaying information. For example, GUI 506 may provide a way of conveying (e.g., displaying) information received from logic circuitry 303. Part of this information may comprise information about submitted tips, including the tips reliability score.

During operation, tips are received from devices 112 at network interface 307. Logic circuitry 303 stores the tip in memory 107 and determines if any images have been received with the tip. If images have been received with the tip, logic circuitry 303 then obtains a fingerprint of the imager used to create the image. Database 107 is accessed to determine if the fingerprint matches any fingerprints stored in memory 107, and if so, the reliability score associated with the stored fingerprint is applied to the current tip. (It should be noted that if no fingerprint matches the fingerprint of the image submitted with a tip, a new entry will be created within database 107.)

When requested by a device (e.g., device 103), the tip may be provided to the device. As mentioned above, the tip provided to the device will include the reliability score of the fingerprint associated with the tip. If a person viewing the tip wishes to rate the tip's reliability, then this information will be provided to processor 303 and the current reliability for the fingerprint will be adjusted accordingly.

With the above in mind, dispatch center 114 comprises network interface 307 configured to receive a tip from a user, the tip comprising an image. Processor 303 is provided and executes code that instructs processor 303 to determine a fingerprint of the image, the fingerprint of the image being unique to the imager used to capture the image, determine that past images received from past tips share the same fingerprint as the image, associate a score to the tip, wherein the score is based on a score given for the past tips that share the same fingerprint as the image, and provide the tip and the score to an officer.

As discussed above, the fingerprint of the image may comprise a photo-response non uniformity (PRNU) fingerprint of the image, or may comprise a Generative Adversarial Network (GAN) fingerprint of the image.

A dispatch center 114 may include database stored in memory 107. The database comprises fingerprints of images submitted in past tips along with an associated reliability/dependability/trustworthiness score associated with the fingerprints. The processor may then execute code that instructs the processor to accesses the database to determine that past images received from past tips share the same fingerprint as the image.

As discussed, the score for the past tips comprises a measure of reliability/dependability/trustworthiness for the past tips. This score may be modified by receiving receive a current score for the tip from the officer and modifying the score for the past tips based on the received current score for the tip.

Figure 4:
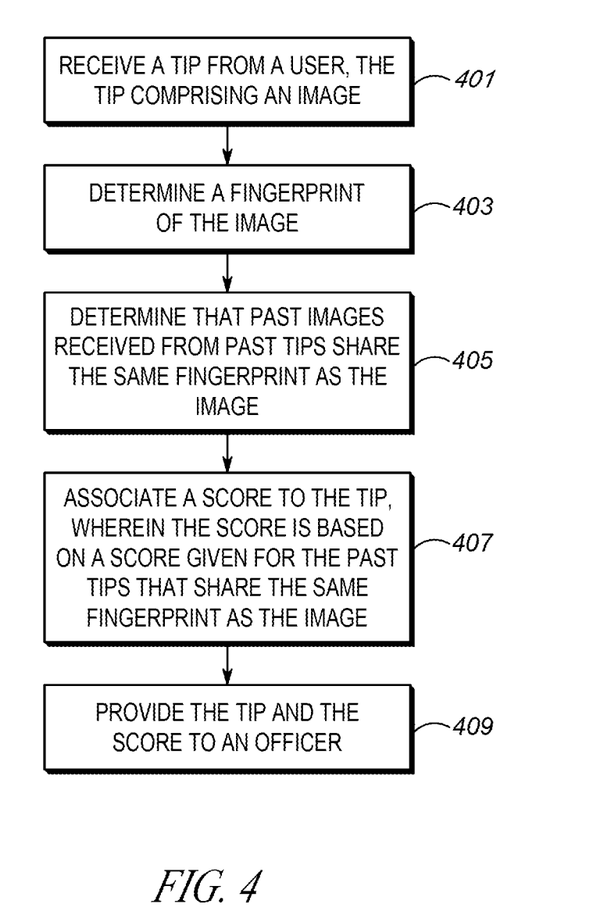
FIG. 4 is a flow chart showing operation of the dispatch center of FIG. 3

FIG. 4 is a flow chart showing operation of the dispatch center 114 acting as a tip-submit server. The logic flow begins at step 401 where network interface 307 receives a tip from a user, the tip comprising an image. In response, logic circuitry 303 determines a fingerprint of the image at step 403. As discussed, the fingerprint of the image is unique to the imager used to capture the image. The logic flow continues to step 405 where logic circuitry 303 determines that past images received from past tips share the same fingerprint as the image, and at step 407 associates a score to the tip, wherein the score is based on a score given for the past tips that share the same fingerprint as the image. Finally, at step 409, logic circuitry provides the tip and the score to an officer.

As discussed above, logic circuitry 303 may access a database to determine that past images received from past tips share the same fingerprint as the image. Additionally, a current score for the tip may be received from the officer, and the score for the past tips may be modified based on the received current score for the tip.

Figure 5:
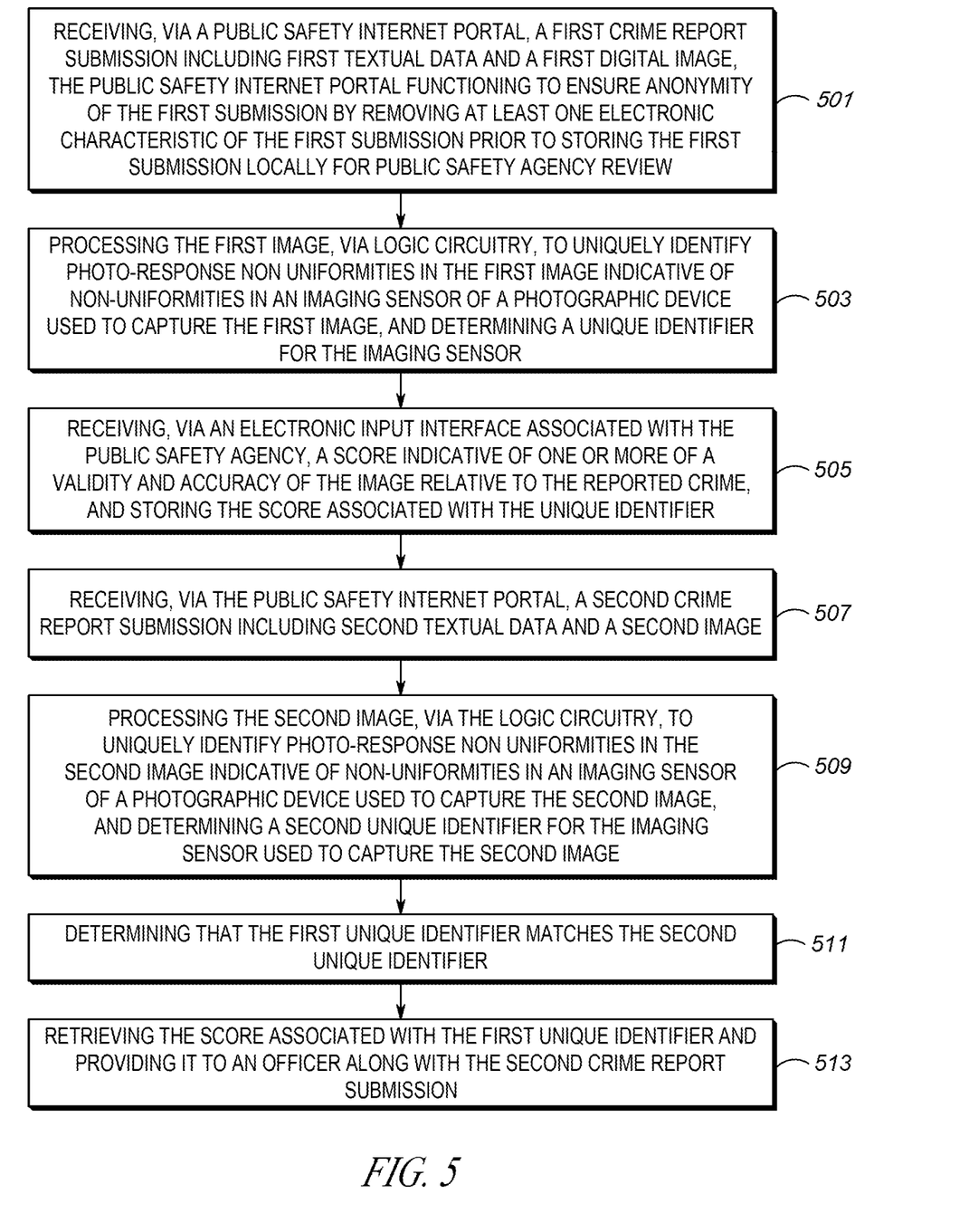
FIG. 5 is a flow chart showing operation of the dispatch center of FIG. 3.

FIG. 5 is a more-detailed flow chart showing operation of dispatch center 114 acting as a tip-submit server. More specifically, the flow chart shown in FIG. 5 illustrates a method for establishing, maintaining, and providing a public safety trust score for anonymously reported crimes including anonymously submitted images. The logic flow begins at step 501 where network interface 307 to a public safety internet portal (e.g., dispatch center 114 serving as a tip-submit server) receives a first crime report submission including first textual data 204 and a first digital image 201. As described above, the public safety internet portal functions to ensure anonymity of the first submission by removing at least one electronic characteristic (e.g., metadata) of the first submission prior to storing the first submission locally for public safety agency review.

At step 503, logic circuitry 303 processes the first image to uniquely identify photo-response non uniformities in the first image indicative of non-uniformities in an imaging sensor of a photographic device used to capture the first image, and determines a unique identifier (fingerprint) for the imaging sensor.

At step 505, network interface 307 receives a score from an officer 101, the score being indicative of one or more of a validity and accuracy of the image relative to the reported crime, and storing the score associated with the unique identifier.

At step 507, network interface 307 receives a second crime report submission including second textual data and a second image and at step 509 logic circuitry 303 processes the second image to uniquely identify photo-response non uniformities in the second image indicative of non-uniformities in an imaging sensor of a photographic device used to capture the second image, and determines a second unique identifier for the imaging sensor used to capture the second image.

The logic flow continues to step 511 where logic circuitry 303 determines that the first unique identifier matches the second unique identifier, and at step 513 retrieves the score from memory 107 associated with the first unique identifier and provides it to an officer along with the second crime report submission.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes may be referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot fingerprint an image using the techniques provided above, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An apparatus for establishing, maintaining, and providing a public safety reliability score for anonymously reported crimes including anonymously submitted images, comprising:
   a network interface configured to receive an anonymously submitted current tip from a user, the anonymously submitted current tip comprising a current image;
   a processor executing code that instructs the processor to:
      ensure anonymity of the anonymously submitted current tip by removing at least one electronic characteristic of the current image and then store the first anonymously submitted tip locally for public safety agency review;
      determine a fingerprint of the current image, the fingerprint of the current image being unique to a particular imager used to capture the current image;
      access a database of image fingerprints of past anonymously submitted images, and determine that past images received from past anonymously submitted tips share the same fingerprint as the current image of the anonymously submitted current tip;
      access a mapping of image fingerprints of past anonymously submitted images and each fingerprint's associated reliability score and associate a particular historical reliability score to the anonymously submitted current tip, wherein the particular historical reliability score is based on scores given for the past anonymously submitted tips that share the same fingerprint as the current image; and
      substantially contemporaneously provide the anonymously submitted current tip and the particular historical reliability score to an officer.

2. The apparatus of claim 1 wherein the fingerprint of the current image comprises a photo-response non uniformity (PRNU) fingerprint of the image.

3. The apparatus of claim 1 wherein the fingerprint of the current image comprises a Generative Adversarial Network (GAN) fingerprint of the image.

4. The apparatus of claim 1 wherein the score for the past tips comprises a calculated average of reliability/dependability/trustworthiness for the past anonymously submitted tips.

5. The apparatus of claim 1 wherein the processor executes code that also instructs the processor to:
receive a current score from the officer indicating an officer determined reliability of the anonymously submitted current tip; and
modify the particular historical reliability score based on the received current score and storing the modified particular historical reliability score in the mapping of image fingerprints of past anonymously submitted images and each fingerprint's associated reliability score.

6. The apparatus of claim 1, the processor executing further code that instructs the processor to cause to be displayed, at a computing device associated with the officer, textual data included in the anonymously submitted current tip and the current digital image, a visual indication of the particular historical reliability score, and a manipulatable input for receiving, via an electronic input interface associated with the computing device associated with the officer, a second score from the officer indicating an officer determined reliability of the anonymously submitted current tip.

7. The apparatus of claim 1, the processor executing further code that instructs the processor to:
receive, via the network interface, a second anonymously submitted current tip comprising a second current image;
determine a second fingerprint of the second current image, the second fingerprint of the second current image being unique to a particular imager used to capture the second current image;
access a database of image fingerprints of past anonymously submitted images, and determine that no past images received from past anonymously submitted tips share the same fingerprint as the current image of the anonymously submitted current tip, and responsively, create a new entry in the database of image fingerprints including the second fingerprint;
subsequently receive, via an electronic input interface associated with the public safety agency, a second score from a second officer indicating an officer determined reliability of the second anonymously submitted crime report submission, and store the second score associated with the second unique identifier in a mapping of image fingerprints of past anonymously submitted images and each fingerprint's associated reliability score.

8. A method for establishing, maintaining, and providing a public safety reliability score for anonymously reported crimes including anonymously submitted images, comprising the steps of:
receiving an anonymously submitted current tip from a user, the anonymously submitted current tip comprising a current image;
ensuring anonymity of the anonymously submitted current tip by removing at least one electronic characteristic of the current image prior to storing the first anonymously submitted tip locally for public safety agency review;
determining a fingerprint of the current image, the fingerprint of the current image being unique to a particular imager used to capture the current image;
accessing a database of image fingerprints of past anonymously submitted images, and determining that past images received from past anonymously submitted tips share the same fingerprint as the current image of the anonymously submitted current tip;
access a mapping of image fingerprints of past anonymously submitted images and each fingerprint's associated reliability score and associating a particular historical reliability score to the anonymously submitted current tip, wherein the particular historical reliability score is based on scores given for the past anonymously submitted tips that share the same fingerprint as the current image; and
substantially contemporaneously providing the anonymously submitted current tip and the particular historical reliability score to an officer.

9. The method of claim 8 wherein the fingerprint of the current image comprises a photo-response non uniformity (PRNU) fingerprint of the image.

10. The method of claim 8 wherein the fingerprint of the current image comprises a Generative Adversarial Network (GAN) fingerprint of the image.

11. The method of claim 8 wherein the score for the past tips comprises a calculated average of reliability/dependability/trustworthiness for the past anonymously submitted tips.

12. The method of claim 8 further comprising the steps of:
receiving a current score from the officer indicating an officer determined reliability of the anonymously submitted current tip; and
modifying the particular historical reliability score based on the received current score and storing the modified particular historical reliability score in the mapping of image fingerprints of past anonymously submitted images and each fingerprint's associated reliability score.

13. The method of claim 8, wherein substantially contemporaneously providing the anonymously submitted current tip and the particular historical reliability score to an officer comprises causing to be displayed, at a computing device associated with the officer, textual data included in the anonymously submitted current tip and the current digital image, a visual indication of the particular historical reliability score, and a manipulatable input for receiving, via an electronic input interface associated with the computing device associated with the officer, a second score from the officer indicating an officer determined reliability of the anonymously submitted current tip.

14. The method of claim 8, further comprising the steps of:
receiving a second anonymously submitted current tip comprising a second current image;
determining a second fingerprint of the second current image, the second fingerprint of the second current image being unique to a particular imager used to capture the second current image;
accessing a database of image fingerprints of past anonymously submitted images, and determining that no past images received from past anonymously submitted tips share the same fingerprint as the current image of the anonymously submitted current tip, and responsively, creating a new entry in the database of image fingerprints including the second fingerprint;

subsequently receiving, via an electronic input interface associated with the public safety agency, a second score from a second officer indicating an officer determined reliability of the second anonymously submitted crime report submission, and storing the second score associated with the second unique identifier in a mapping of image fingerprints of past anonymously submitted images and each fingerprint's associated reliability score.

15. A method for establishing, maintaining, and providing a public safety reliability score for anonymously reported crimes including anonymously submitted images, the method comprising:

receiving, via a public safety internet portal, a first anonymously submitted current crime report submission including first current textual data and a first current digital image, the public safety internet portal functioning to ensure anonymity of the first anonymously submitted current crime report submission by removing at least one electronic characteristic of the first current digital image prior to storing the first anonymously submitted crime report submission locally for public safety agency review;

processing the first current digital image image, via logic circuitry, to produce a first unique identifier that uniquely identify photo-response non uniformities in the first current digital image indicative of non-uniformities in a first particular imaging sensor of a first photographic device used to capture the first current digital image image;

accessing a database of image fingerprints of past anonymously submitted images, and storing the first unique identifier in the database of image fingerprints;

receiving, via an electronic input interface associated with the public safety agency, a first score from an officer indicating an officer determined reliability of the first anonymously submitted crime report submission, and storing the first score associated with the first unique identifier in mapping of image fingerprints of past anonymously submitted images and each fingerprint's associated reliability score;

subsequently receiving, via the public safety internet portal, a second anonymously submitted current crime report submission including second current textual data and a second current digital image;

processing the second current digital image, via the logic circuitry, to uniquely identify photo-response non uniformities in the second current digital image indicative of non-uniformities in a second particular imaging sensor of a second photographic device used to capture the second current digital image, and determining a second unique identifier for the second particular imaging sensor used to capture the second current digital image;

accessing the database of image fingerprints of past anonymously submitted images to retrieve the first unique identifier, and determining that the first unique identifier matches the second unique identifier; and accessing the mapping of image fingerprints of past anonymously submitted images and each fingerprint's associated reliability score and retrieving the first score associated with the first unique identifier and substantially contemporaneously providing the first score to a second officer along with the second anonymously submitted current crime report submission.

16. The method of claim 15, wherein providing the first score to the second officer along with the second anonymously submitted current crime report submission comprises displaying, at a computing device associated with the second officer, the second current textual data and the second current digital image, a visual indication of the first score, and a manipulatable input for receiving, via an electronic input interface associated with the computing device associated with the second officer, a second score from the second officer indicating an officer determined reliability of the second anonymously submitted crime report submission.

17. The method of claim 16, further comprising modifying the first score in light of the second score, and storing the modified first score in the mapping of image fingerprints of past anonymously submitted images and each fingerprint's associated reliability score.

* * * * *